D. J. ELLIOTT.
GANG PLOW.
APPLICATION FILED SEPT. 3, 1909.
957,149.
Patented May 3, 1910.
3 SHEETS—SHEET 3.
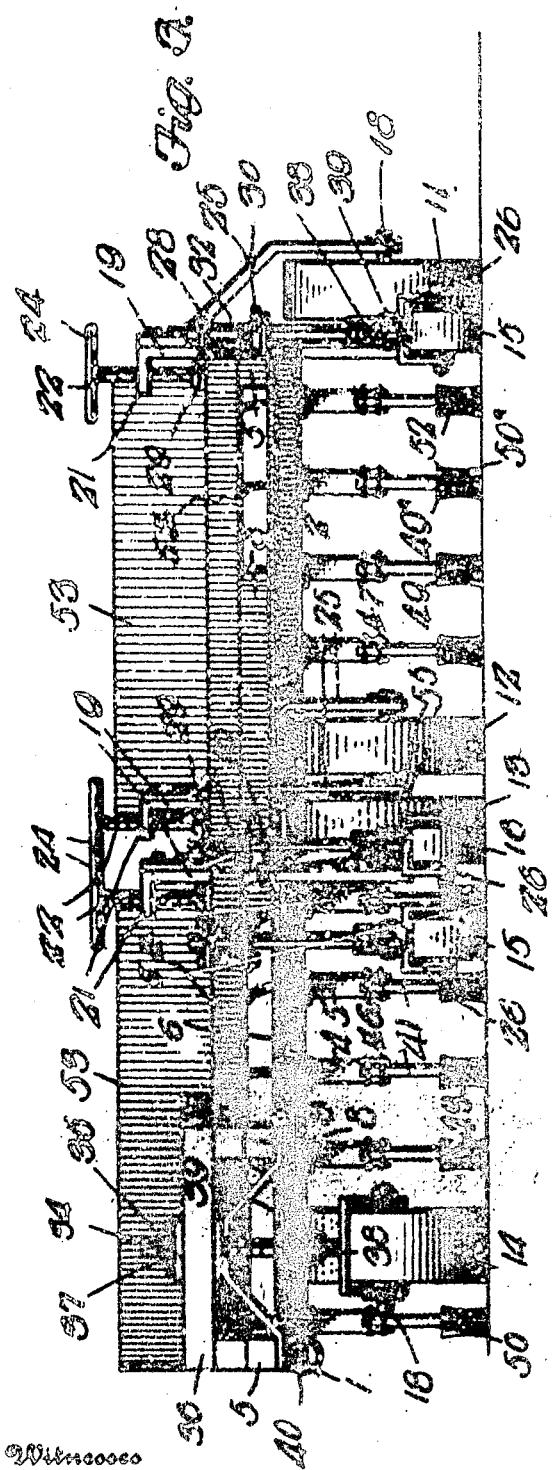
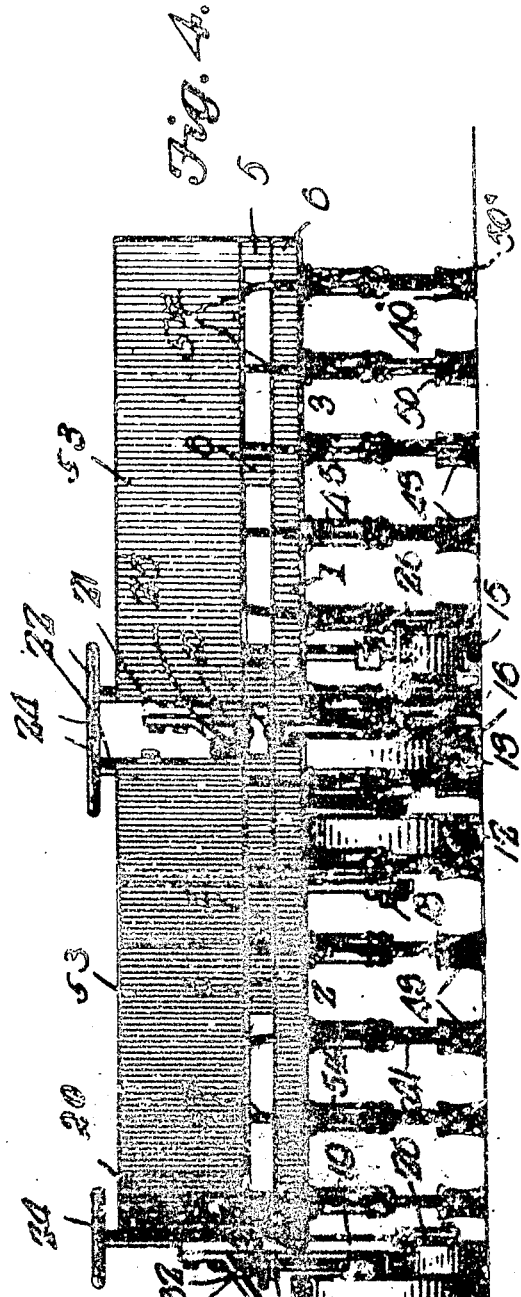
Witnesses
Inventor
David J. Elliott,
by Victor J. Evans
Attorney

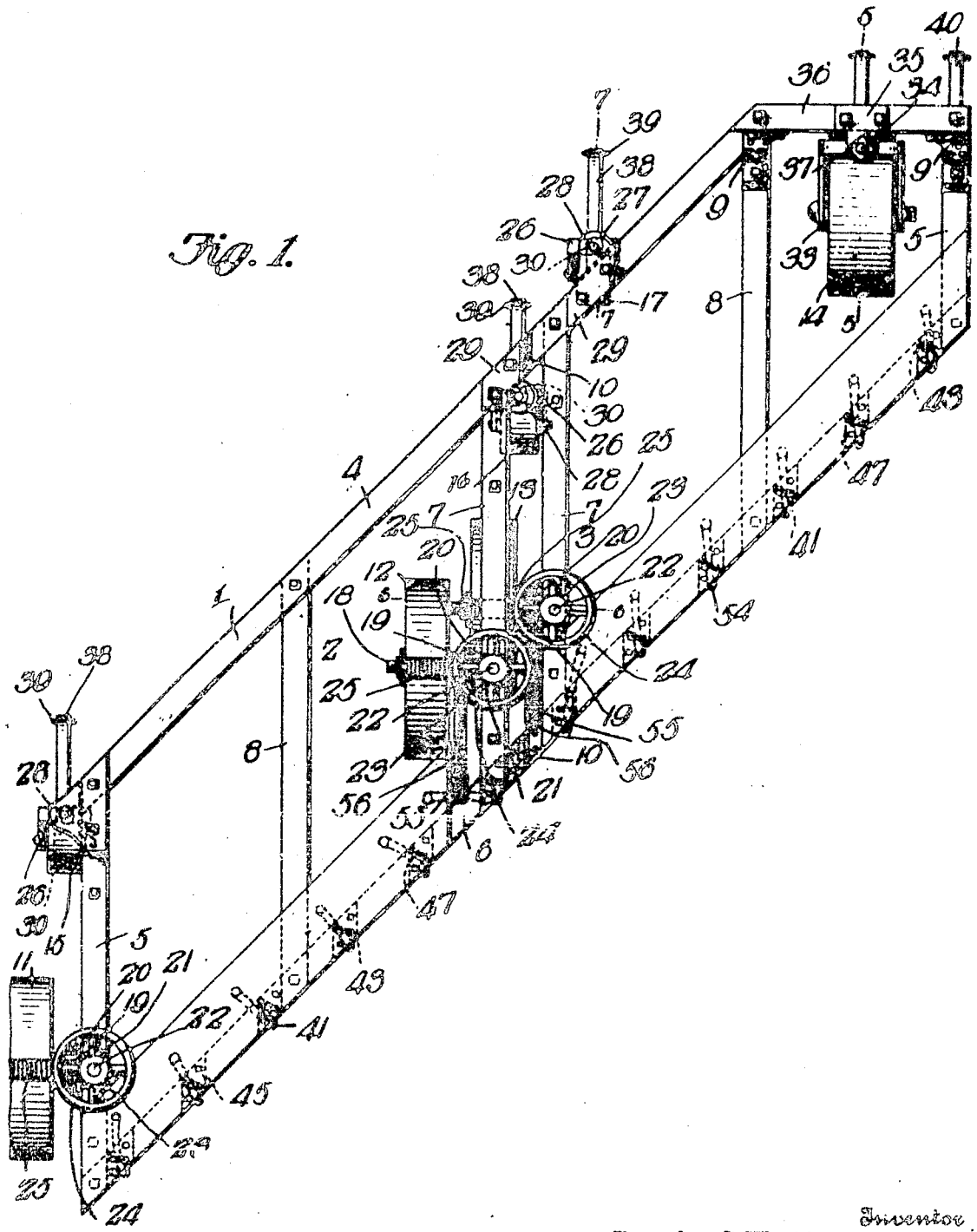

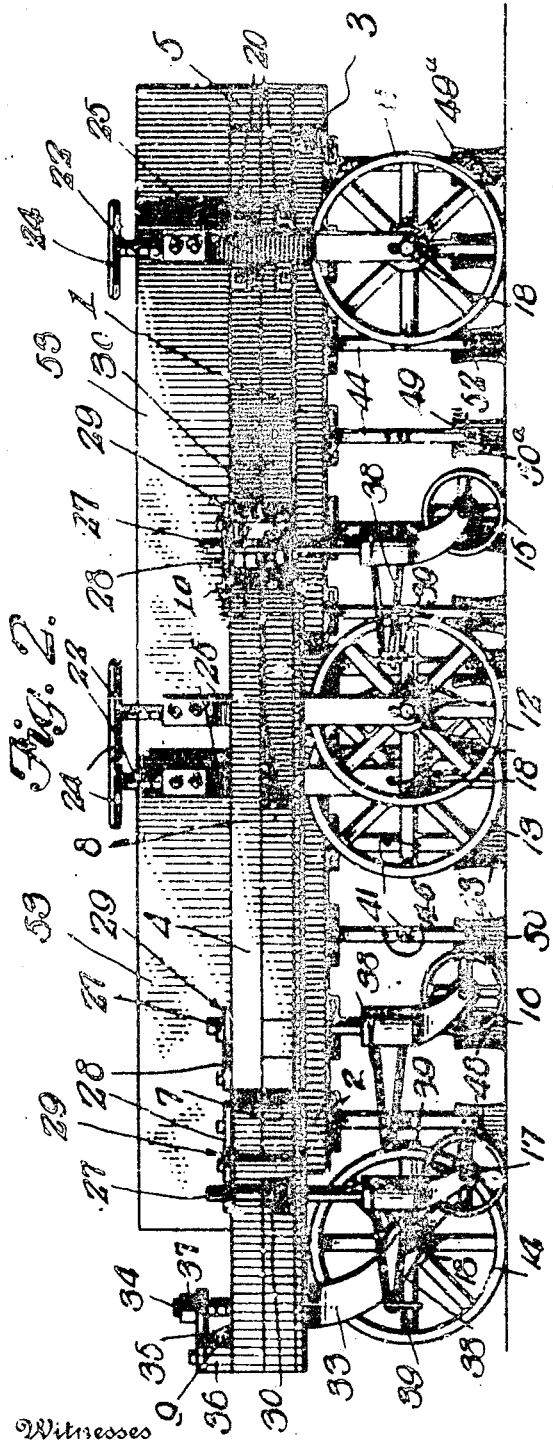

UNITED STATES PATENT OFFICE.

DAVID J. ELLIOTT, OF MONTE VISTA, COLORADO.

GANG-PLOW.

957,749.

Specification of Letters Patent.

Patented May 3, 1910.

Application filed September 8, 1909. Serial No. 516,792.

*To all whom it may concern:*

Be it known that I, DAVID J. ELLIOTT, a citizen of the United States, residing at Monte Vista, in the county of Rio Grande and State of Colorado, have invented new and useful Improvements in Gang-Plows, of which the following is a specification.

This invention relates to gang plows, the object of the invention being to provide an implement of this character which is adapted to be drawn by an engine and easily follow the same in its course, which will adjust itself to the unevenness of the land, which embodies simple and effective means for regulating the depth of penetration of the shares, and which also embodies a novel construction and arrangement of the draft connections to adapt the implement to follow close to the engine, to lighten the draft of the implement and to prevent side draft and sluing thereof.

With these and other objects in view, the invention consists of the features of construction, combination and arrangement of parts hereinafter fully described and claimed, reference being had to the accompanying drawings, in which:—

Figure 1 is a top plan view of a gang plow constructed in accordance with my invention, the seed boxes being omitted. Figs. 2, 3 and 4 are, respectively, a side elevation, a front elevation and a rear elevation of the same. Figs. 5, 6 and 7 are detail sections on the lines 5—5, 6—6 and 7—7 of Fig. 1.

Referring to the drawings, 1 designates the frame of the implement, which is preferably of rhomboid form and longitudinally divided to provide two relatively movable sections 2 and 3, each consisting of a front transverse bar 4, an outer side bar 5, a rear diagonal bar 6, and inner and intermediate longitudinal bars 7 and 8, the bars being bolted or otherwise strongly fastened together and stayed at their points of attachment by braces 9. The front and rear bars of the sections 2 and 3 are hingedly or pivotally connected, as at 10, to permit said sections to have independent movement in the operation of the instrument so that said sections and the shares carried thereby may adjust themselves to irregularities or inequalities in the surface of the land or soil. The frame sections are mounted upon caster wheels arranged at proper points to effectually support the same and enable the implement to be easily steered to follow the course of the tractor or engine. As shown, main supporting caster wheels 11, 12, 13 and 14 are arranged at the outer rear corner of the frame section 2, at the inner rear corners of both frame sections and at the outer front corner of the section 3, while auxiliary caster wheels 15, 16 and 17 are arranged respectively at the outer front corner of the frame section 2 and at the inner front corners of both frame sections, the main wheels being of relatively greater size and strength than the auxiliary wheels to sustain the greater portion of the weight and strain at the points at which they are arranged, the wheels 15, 16 and 17 operating in conjunction with the wheel 14 as steering wheels for the implement, as hereinafter described. The wheels 11, 12, and 13 are each mounted upon a supporting spindle 18 extending laterally from a bearing standard 19 slidably mounted in guides 20 on the adjacent bar of the frame and provided at its upper end with a laterally extending bearing arm 21 through which passes and in which is journaled a screw shaft 22, which shaft works in a threaded socket formed in a bearing plate or bracket 23 fixed to the frame bar or beam, by which mode of mounting the frame may be adjusted on the standards 19 to easily and conveniently raise and lower the same and correspondingly adjust the shafts to move over the surface of the ground in the transportation of the implement or to penetrate the ground to a greater or less extent to form furrows of varying depths. As the weight of implements of this character is comparatively great, adjusting means of this character is of primary importance, as it allows great power to be applied and at points where an easy and convenient adjustment may be secured to raise or lower the portions of the frame to the desired level.

Each shaft 22 is provided at its upper end with a hand wheel 24 to enable it to be conveniently turned, and preferably the outer end of each spindle is connected and reinforced from its standard by a brace 25. Each auxiliary caster wheel is journaled in the forked lower end 26 of a vertical rod or stem 27 journaled in spaced ears 28 on a bearing bracket 29 fixed to the frame. These rods or stems 27 are adapted to be manually adjusted after the main supporting wheels have been adjusted to set the frame at the desired elevation, and are provided with stop collars 30 to hold them against vertical movement. Each stop collar 30 is provided with a set screw 31 to fix it to the stem and is held from movement between the lower ear 28 and a superposed notched stop piece 32 arranged upon the bracket between the ears, in the notch of which stop piece the stem fits. The auxiliary wheels are arranged to support the frame at the front where the strain is comparatively light and partially sustained by the tractor or engine employed to draw the implement.

The front main caster wheel 14 may be mounted for adjustment in a manner similar to the other main wheels, but is herein shown as adapted for use in conjunction with the auxiliary wheels 15, 16 and 17 as a steering wheel and is mounted upon the lower forked end 33 of a rod or stem 34 journaled in a bearing bracket 35 on a cross piece 36 bolted to and seated upon the adjacent ends of the bars 4 and 5 of the section 3 which are separated at this point. The upper end of said stem is threaded for the reception of a binding nut 37 which is adapted to be turned by an ordinary wrench bar and to be fixed, if desired, in adjusted position to the bracket.

The stems of the respective wheels 15, 16 and 17 have draft arms 38 fixed thereto, and the draft arms of the wheels 15, 16 and 17 are provided with rings or links 39 for coupling engagement with draft chains or other similar flexible draft connection adapted to connect the same with the tractor or engine. The outer corner portion of the frame section 3 is provided with a link or eye 40 for a similar purpose, while the draft arm of the wheel 14 is adapted to be coupled by a main coupling bar or the like with a main coupling member on the engine, so that the draft strain will be equalized from side to side of the implement in an effective manner to prevent side draft and sluing of the implement.

It will be understood from the foregoing description that the construction of the front portion of the frame allows the implement to be coupled up close to the engine so as to diminish the tendency to side draft, as well as to cause the draft to be transmitted in an upward direction to partially sustain the front portion of the frame and thereby lighten the draft. As the draft connections between the engine and implement are connected with the arms 38 of the front caster wheels, which arms act as cranks, it will be obvious that when the engine is turned the caster wheels will be correspondingly turned to steer the implement and cause it to follow accurately in the path of the engine.

The diagonal rear bars 6 form supports for the plows, of which any desired number may be used according to the width of the frame and the number of furrows to be formed. The plow standards 41 have each the usual form of foot portion 42, to which is bolted the plow share 43. Each standard fits at its upper end between the arms of a bifurcated bracket 45 bolted to the beam and is pivoted thereto by a cross bolt 46. Above the bolt the standard and arms of the bracket are apertured for the passage of a transverse retaining pin 47 made of hard wood or other suitable material of sufficient strength to hold the standard in position in ordinary operation, but which is adapted to break if the share should encounter a rock, spot of frozen earth or other obstruction which it cannot pass, thus freeing the shaft for rearward pivotal movement so that it will pass over such obstruction without injury.

A plow constructed in accordance with my invention as above described will cut a series of furrows in one operation and at the same time thoroughly break or pulverize the soil, while the construction of the frame and supporting wheels insures a light and easy draft, the automatic adjustability of the frame sections to accommodate themselves to irregularities of the land, and ease of movement of the implement in turning to readily steer and follow the course of the tractor or engine. By the described construction of draft connections the pulling strain of the engine is also properly distributed, thus overcoming the tendency of the plow to slue as it is drawn along the field.

If desired the implement may be used for both plowing and planting, in which event a seed box or hopper 53 may be mounted upon each frame section, each seed box having a series of dropping devices equal in number to the shares on said frame section and provided with dropper tubes 54 extending downwardly to points in rear of the shares to deposit the seed into the furrows formed thereby, by which operation the seed deposited in a furrow formed by one share will be covered by the earth turned over by the next adjacent share. It has been found in practice that this method of planting the seed the full depth of the furrow yields better results than if the seed were planted in soil plowed and harrowed before the seed is drilled. The droppers of each seeder are adapted to be operated by a common drive shaft 55 driven by chain and sprocket gearing 56 from the supporting wheels 12 and 13 of the frame sections, any suitable type of controlling gearing being provided to throw the seeders into and out of action and regulate the points of deposit of the seed. In the use of the implement for both plowing and planting as described, a harrow may be connected with the rear of the plow so as to follow it across the field and effect the more thorough covering of the seed and pulverization of the soil.

Having thus fully described the invention, what is claimed as new, is:—

1. A gang plow comprising a rhomboid frame composed of pivotally connected sections having front and rear diagonal bars, plows supported by the rear diagonal bars of the frame sections, supporting wheels adjustably connected with the rear portions of the frame sections, caster wheels adjustably connected with the front portions of the frame sections, and draft devices connected with said caster wheels.

2. A gang plow comprising a rhomboid frame composed of pivotally connected sections having front and rear diagonal bars, main supporting wheels adjustably connected with the inner rear corner portions of the sections and outer rear corner portion of one of the sections, a main caster wheel adjustably connected with the front outer corner portion of the other section, auxiliary caster wheels adjustably connected with the inner front corner portion of said section, and the inner and outer front corner portions of the other section, plows carried by the rear diagonal bars of the frame sections, and draft devices connected with said caster wheels.

3. A gang plow comprising a rhomboid frame composed of pivotally connected sections having front and rear diagonal bars, main supporting wheels adjustably connected with the inner rear corner portions of the sections and outer rear corner portion of one of the sections, a main caster wheel adjustably connected with the front outer corner portion of the other section, auxiliary caster wheels adjustably connected with the inner front corner portion of said section, and the inner and outer front corner portions of the other section, plows carried by the rear diagonal bars of the frame sections, draft devices connected with said caster wheels, and a draft connection upon the frame section carrying said main caster wheel and arranged outwardly beyond the latter.

4. A gang plow comprising a rhomboid frame embodying longitudinally divided pivotally connected sections having front and rear diagonal bars, plows supported by the rear diagonal bars of said sections, carrying wheels supporting the rear portions of the frame sections, screw shafts for adjusting the same, caster wheels upon the front portions of the frame sections and adjustably connected therewith, and draft devices carried by one of said frame sections and said caster wheels.

In testimony whereof I affix my signature in presence of two witnesses.

DAVID J. ELLIOTT.

Witnesses:
W. E. WHITE,
E. E. GOODDING.